US012002043B2

(12) United States Patent
Paavolainen

(10) Patent No.: US 12,002,043 B2
(45) Date of Patent: Jun. 4, 2024

(54) METHOD FOR ENABLING EFFICIENT EVALUATION OF TRANSACTIONS IN A DISTRIBUTED LEDGER NETWORK

(71) Applicant: Telefonaktiebolaget LM Ericsson (publ), Stockholm (SE)

(72) Inventor: Santeri Paavolainen, Masala (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 276 days.

(21) Appl. No.: 17/754,422

(22) PCT Filed: Oct. 2, 2019

(86) PCT No.: PCT/EP2019/076763
§ 371 (c)(1),
(2) Date: Mar. 31, 2022

(87) PCT Pub. No.: WO2021/063503
PCT Pub. Date: Apr. 8, 2021

(65) Prior Publication Data
US 2022/0327526 A1    Oct. 13, 2022

(51) Int. Cl.
*G06Q 20/38*    (2012.01)
(52) U.S. Cl.
CPC ....... *G06Q 20/389* (2013.01); *G06Q 2220/00* (2013.01)
(58) Field of Classification Search
CPC .. G06Q 20/389; G06Q 2220/00; G06Q 10/00; G06Q 10/063; G06Q 10/083; G06Q 10/08
See application file for complete search history.

(56) References Cited

U.S. PATENT DOCUMENTS 11,249,985 B2 *   2/2022   Wu ...................... G06F 16/9024
2017/0005804 A1 * 1/2017   Zinder ................ G06F 21/6254
(Continued)

FOREIGN PATENT DOCUMENTS

EP        3518163 A1 *   7/2019
WO    2019067798 A1     4/2019
(Continued)

OTHER PUBLICATIONS

International Search Report and Written Opinion for Application No. PCT/EP2019/076763, dated Mar. 31, 2020, 15 pages.
(Continued)

*Primary Examiner* — Patrick McAtee
*Assistant Examiner* — Vincent I Idiake
(74) *Attorney, Agent, or Firm* — Nicholson De Vos Webster & Elliott LLP

(57) ABSTRACT

Methods and apparatuses for enabling efficient evaluation of transactions in a distributed ledger network are described. In one embodiment, a distributed ledger technology (DLT) node that is to evaluate multiple transactions determines dependencies between the transactions. Each transaction includes an input parameter and an output parameter. The input parameter includes indicators of states of addresses in the distributed ledger network that are to be used as inputs to the transaction. The output parameter includes addresses whose respective states are modified by the transaction. The DLT node evaluates the transactions based on the dependencies, where the evaluation of the transactions includes evaluating a first and a second transaction in parallel when the first transaction and the second transaction are independent from one another, and evaluating the first transaction and the second transaction sequentially, when the first transaction and the second transaction are not independent from one another.

15 Claims, 8 Drawing Sheets

(56) References Cited

U.S. PATENT DOCUMENTS

2019/0019144 A1   1/2019   Gillen
2020/0042992 A1*  2/2020   Zhang ................ G06Q 20/3674
2020/0238952 A1*  7/2020   Lindsay .............. G06V 30/194

FOREIGN PATENT DOCUMENTS

WO    2019120334 A2   6/2019
WO    2020104010 A1   5/2020
WO    2020114590 A1   6/2020

OTHER PUBLICATIONS

Thomas Dickerson et al., "Adding Concurrency to Smart Contracts," 2017, pp. 303-312, Proceedings of the ACM Symposium on Principles of Distributed Computing (PODC '17), ACM.

Parwat Singh Anjana et al., "An Efficient Framework for Optimistic Concurrent Execution of Smart Contracts," 2019, 16 pages, Department of Computer Science and Engineering, IIT Hyderabad, India.

Christian Cachin et al., "The Transaction Graph for Modeling Blockchain Semantics," 2017, 27 pages.

Emmanuelle Anceaume et al., "Sycomore: A Permissionless Distributed Ledger that Self-Adapts to Transactions Demand," 2018, pp. 1-8, 2018 IEEE 17th International Symposium on Network Computing and Applications (NCA), Cambridge, MA.

Huma Pervez et al., "A Comparative Analysis of DAG-Based Blockchain Architectures," 2018, pp. 27-34, 2018 12th International Conference on Open Source Systems and Technologies (ICOSST), Lahore, Pakistan.

An Zhang et al., "Enabling Concurrency on Smart Contracts Using Multiversion Ordering," 2018, pp. 425-439, APWeb-WAIM, Lecture Notes in Computer Science, vol. 10988, Springer International Publishing AG.

International Preliminary Report on Patentability for Application No. PCT/EP2019/076763, dated Apr. 14, 2022, 9 pages.

* cited by examiner

METHOD FOR ENABLING EFFICIENT EVALUATION OF TRANSACTIONS IN A DISTRIBUTED LEDGER NETWORK

CROSS-REFERENCE TO RELATED APPLICATIONS

This application is a National stage of International Application No. PCT/EP2019/076763, filed Oct. 2, 2019, which is hereby incorporated by reference.

TECHNICAL FIELD

The present disclosure relates to the field of distributed ledger technology; and more specifically, to a method, a node, a computer program, a carrier and a computer program product for transactions evaluation in a distributed ledger network.

BACKGROUND

Distributed ledger technology (DLT) systems are platforms used for building, running, and deploying a decentralized, distributed and public distributed digital ledger. In a DLT system a digital ledger permanently records digital records of transactions that occur between two parties. The records cannot be altered retroactively without the alteration of all subsequent transactions in the digital ledger and without consensus from other nodes in the network. This allows the participants to verify and audit transactions inexpensively and securely. A digital ledger is maintained without a central authority or implementation. For example, the digital ledger can be a blockchain that includes blocks secured and linked to one another using cryptographic mechanisms.

In DLTs users submit transactions to the ledger. These transactions are then evaluated by a DLT node to be merged into the ledger's permanent and irrefutable record, herein referred to as the DLT datastore. The transactions may perform several types of operations. For example, transactions can be used to perform value transfers (sending a cryptocurrency from one account to another), or to invocate smart contracts (deterministically secure computation).

Typically a DLT node in the DLT network may obtain several transactions to be evaluated. In some DLTs, for example in block based DLT networks, several transactions are evaluated to be included in an intermediary structure (such as a block) that is then recorded in the DLT datastore. Two transactions can be independent from one another such that the operations performed by a transaction does not affect the operation of the other transaction. Alternatively, two transactions may depend from one another such that the first transaction needs to be evaluated prior to the second one being evaluated to ensure that evaluation of the second operation succeeds. While, some DLT nodes may have the computing resources to evaluate transactions in parallel, the existing mechanisms for specifying and evaluating transactions are highly sequential as the DLT nodes are not able to determine and take advantage of the dependencies between the multiple transactions.

SUMMARY

One general aspect includes a method of transactions evaluation in a distributed ledger network, the method including: determining dependencies between a plurality of transactions of the distributed ledger network, where each transaction of a subset of the plurality of transactions includes an input parameter including indicators of first states of first addresses in the distributed ledger network that are to be used as inputs to the transaction and an output parameter including zero or more second addresses whose respective zero or more second states are modified by the transaction; and evaluating the plurality of transactions based on the dependencies, where the evaluating includes: responsive to determining that a first transaction of the plurality of transaction and a second transaction of the plurality of transactions are independent from one another, evaluating the first and the second transactions in parallel; and responsive to determining that the first transaction and the second transaction are not independent from one another, evaluating the first transaction and the second transaction sequentially.

One general aspect includes a computer program including instructions which, when executed on at least one processor, cause the at least one processor to carry out a method of transactions evaluation in a distributed ledger network, the method including: determining dependencies between a plurality of transactions of the distributed ledger network, where each transaction of a subset of the plurality of transactions includes an input parameter including indicators of first states of first addresses in the distributed ledger network that are to be used as inputs to the transaction and an output parameter including zero or more second addresses whose respective zero or more second states are modified by the transaction; and evaluating the plurality of transactions based on the dependencies, where the evaluating includes: responsive to determining that a first transaction of the plurality of transaction and a second transaction of the plurality of transactions are independent from one another, evaluating the first and the second transactions in parallel; and responsive to determining that the first transaction and the second transaction are not independent from one another, evaluating the first transaction and the second transaction sequentially.

One general aspect includes a carrier containing a computer program, where the carrier includes one of an electronic signal, optical signal, radio signal or computer readable storage medium, and the computer program includes instructions which, when executed on at least one processor, cause the at least one processor to carry out a method of transactions evaluation in a distributed ledger network, the method including: determining dependencies between a plurality of transactions of the distributed ledger network, where each transaction of a subset of the plurality of transactions includes an input parameter including indicators of first states of first addresses in the distributed ledger network that are to be used as inputs to the transaction and an output parameter including zero or more second addresses whose respective zero or more second states are modified by the transaction; and evaluating the plurality of transactions based on the dependencies, where the evaluating includes: responsive to determining that a first transaction of the plurality of transaction and a second transaction of the plurality of transactions are independent from one another, evaluating the first and the second transactions in parallel; and responsive to determining that the first transaction and the second transaction are not independent from one another, evaluating the first transaction and the second transaction sequentially.

One general aspect includes a computer program product including non-transitory computer readable media having stored thereon a computer program including instructions which, when executed on at least one processor, cause the at least one processor to carry out a method of transactions evaluation in a distributed ledger network, the method including: determining dependencies between a plurality of transactions of the distributed ledger network, where each transaction of a subset of the plurality of transactions includes an input parameter including indicators of first states of first addresses in the distributed ledger network that are to be used as inputs to the transaction and an output parameter including zero or more second addresses whose respective zero or more second states are modified by the transaction; and evaluating the plurality of transactions based on the dependencies, where the evaluating includes: responsive to determining that a first transaction of the plurality of transaction and a second transaction of the plurality of transactions are independent from one another, evaluating the first and the second transactions in parallel; and responsive to determining that the first transaction and the second transaction are not independent from one another, evaluating the first transaction and the second transaction sequentially.

One general aspect includes a node in a distributed ledger network for transaction evaluation, the node including: one or more processors; and a computer readable storage medium storing a set of computer readable instructions that when executed by the one or more processors cause the node to: determine dependencies between a plurality of transactions of the distributed ledger network, where each transaction of a subset of the plurality of transactions includes an input parameter including indicators of first states of first addresses in the distributed ledger network that are to be used as inputs to the transaction and an output parameter including zero or more second addresses whose respective zero or more second states are modified by the transaction; and evaluate the plurality of transactions based on the dependencies, where the evaluating includes: responsive to determining that a first transaction of the plurality of transaction and a second transaction of the plurality of transactions are independent from one another, evaluate the first and the second transactions in parallel; and responsive to determining that the first transaction and the second transaction are not independent from one another, evaluate the first transaction and the second transaction sequentially.

BRIEF DESCRIPTION OF THE DRAWINGS

The present disclosure may best be understood by referring to the following description and accompanying drawings that are used to illustrate embodiments of the present disclosure. In the drawings.

DETAILED DESCRIPTION

Figure 1:
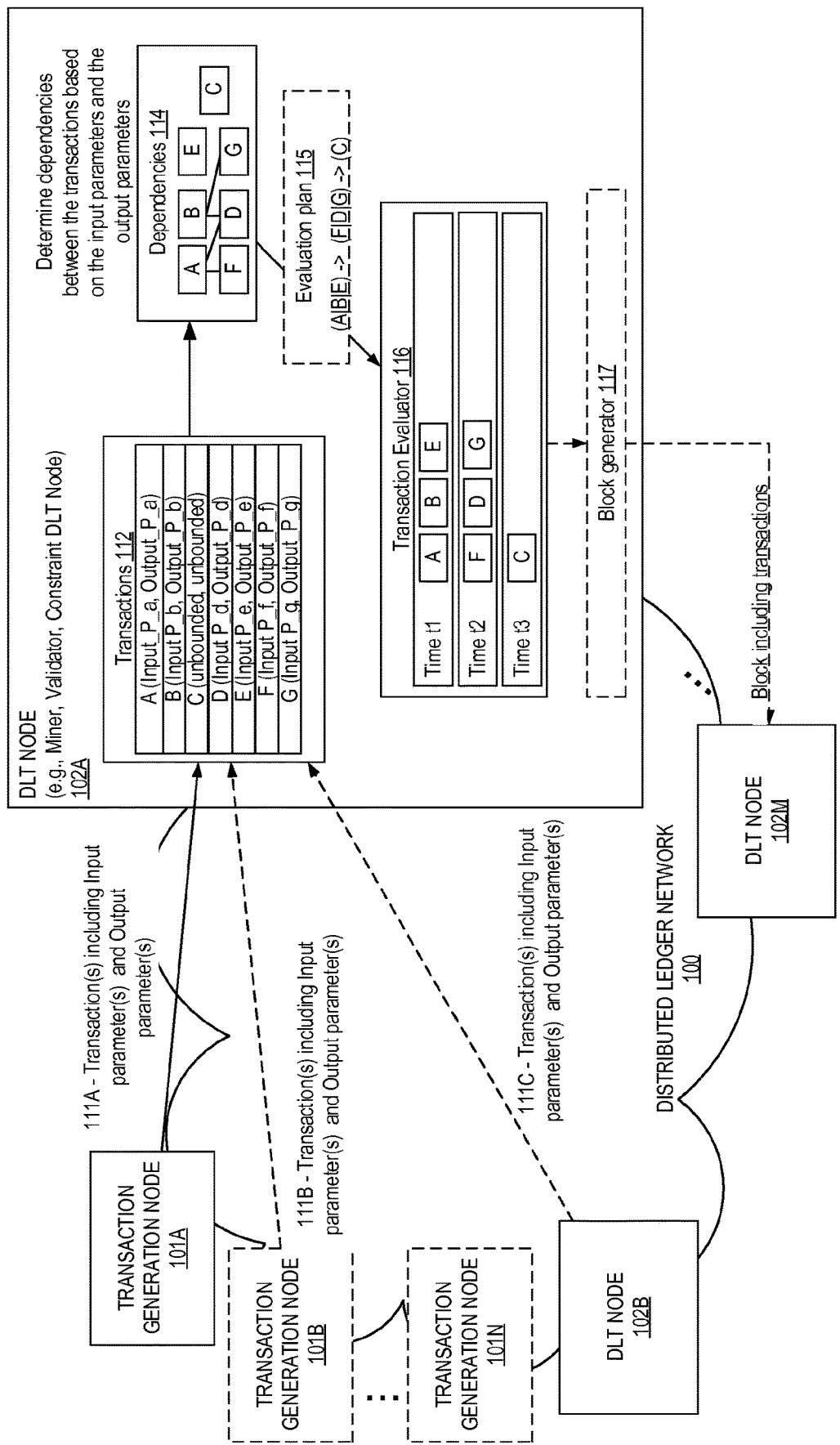
FIG. 1 illustrates a block diagram of an exemplary distributed ledger (DLT) network for enabling efficient evaluation of transactions, in accordance with some embodiments.

The following description describes methods and apparatus for enabling efficient evaluation of transactions in a distributed ledger network. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present disclosure. It will be appreciated, however, by one skilled in the art that the embodiments may be practiced without such specific details. In other instances, control structures, gate level circuits and full software instruction sequences have not been shown in detail in order not to obscure the embodiments. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to some embodiments. However, such notation should not be taken to mean that these are the only options or optional operations, and/or that blocks with solid borders are not optional in certain embodiments.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Existing Solutions for Evaluation of Transactions in a Distributed Ledger Network:

The evaluation of multiple transactions in a DLT node are limited as the dependencies between the different transactions are not bound or known before the transaction is evaluated for DLT inclusion. As an example, a smart contract may depend on an arbitrary input state, and this dependence is only known when the corresponding transaction invoking the smart contract is evaluated. If the state of "A" is initially "0", and there are two transactions, one setting "A=1" and another invoking a smart contract with the logic of "if A==0 then C=1 else D=E", if the smart contract is invoked first, that transaction will read input from state A, and modify state C; if second, it will read from A and E, and modify state D. This relationship between the two transactions requires that evaluation of these two transactions be performed sequentially to ensure a deterministic evaluation of the transactions.

In several DLTs, the evaluation of a transactions is performed by 1) selecting transactions that are eligible for evaluation from a set of available transactions based on some a selection criterion (such as picking transactions offering maximum processing fees); 2) evaluating the selected transactions in some predetermined order (e.g., order of receipt, order of fees, etc.), and 3) recording results of the evaluation in the next DLT state (e.g., in the next block for blockchain).

Some DLT networks use directed acyclic graphs (DAGs) to allow for parallel evaluation of transactions. "H. Pervez, M. Muneeb, M. U. Irfan and I. U. Haq, "A Comparative Analysis of DAG-Based Blockchain Architectures," 2018 *12th International Conference on Open Source Systems and Technologies* (*ICOSST*), Lahore, Pakistan, 2018, pp. 27-34" summarize several DAG-oriented DLTs. In some DLT networks, nodes submit new transactions that refer to earlier transactions, however, the referral is used only for the purpose of confirming earlier transactions (their existence and correctness), and the submitted transaction may be functionally independent of the referred transactions.

"Thomas Dickerson, Paul Gazzillo, Maurice Herlihy, and Eric Koskinen, 2017, Adding Concurrency to Smart Contracts. In *Proceedings of the ACM Symposium on Principles of Distributed Computing* (PODC '17). ACM, New York, NY, USA, 303-312" presents another approach for transaction evaluation. In this approach, evaluation of transactions is performed in parallel based on software transactional memory (STM) techniques. DLT nodes (such as miners or validator in a blockchain) execute transactions speculatively in parallel, allowing non-conflicting transactions to proceed concurrently, and "discovering" a serializable concurrent schedule for a block's transactions. This schedule is captured and encoded as a deterministic fork-join program used by validators to re-execute the miner's parallel schedule deterministically but concurrently. In this approach, the DLT node does not consider dependencies between the transactions before the evaluation of the transactions, which may cause evaluation of some transactions to be conflicting and cause the DLT node to need to address/correct these errors.

The approach presented in "Parwat Singh Anjana, Sweta Kumari, Sathya Peri, Sachin Rathor, and Archit Somani, 2019, An Efficient Framework for Optimistic Concurrent Execution of Smart Contracts, Department of Computer Science and Engineering, IIT Hyderabad, India" builds on the approach presented by Dickerson et al., and introduces an optimistic STM model that further increases the DLT nodes' efficiency. However, the same shortcomings apply here as the DLT node does not consider dependencies between the transactions before the evaluation of the transactions, which may cause evaluation of some transactions to be conflicting and cause the DLT node to need to address/correct these errors.

In "Zhang A., Zhang K. (2018) Enabling Concurrency on Smart Contracts Using Multiversion Ordering. In: Cai Y., Ishikawa Y., Xu J. (eds) Web and Big Data. APWeb-WAIM 2018. Lecture Notes in Computer Science, vol 10988. Springer, Cham" a multiversion transaction ordering (MVTO) is presented. According to this approach, miners are able to use any concurrency control technique to discover a conflict-serializable schedule. Then, validators use MVTO to verify the block by replaying this schedule concurrently and deterministically. However, similar to approaches described above, the first DLT node (e.g., a miner) that evaluates the transactions is not able to use dependencies between the different transactions in order to determine the evaluation order of these transactions.

The approach presented in "E. Anceaume, A. Guellier, R. Ludinard and B. Sericola, "Sycomore: A Permissionless Distributed Ledger that Self-Adapts to Transactions Demand," 2018 *IEEE 17th International Symposium on Network Computing and Applications* (*NCA*), Cambridge, MA, 2018, pp. 1-8" describes a system where not transactions, but blocks form a DAG (referred to as SYC-DAG). The authors propose a way to organize transactions and blocks in a distributed ledger to address the performance issues of permissionless ledgers. The SYC-DAG allows self-adaptivity to transactions demand. However, this approach focuses on increasing transactional performance by allowing multiple miners to operate in parallel on different branches of the DAG chain of blocks on different sets of transactions but does not address the potential of parallel evaluation of transactions within a single node.

Therefore, there is a need for a robust solution that enables efficient evaluation of transactions in nodes of a DLT network.

Enabling Parallel Evaluation of DLT Transactions in a Network Device:

The embodiments described herein present methods and apparatuses for enabling efficient evaluation of transactions in a distributed ledger network. In one embodiment, a DLT node that is to evaluate multiple transactions determines dependencies between the transactions. Each transaction from a subset of the transactions includes an input parameter and an output parameter. The input parameter includes indicators of first states of first addresses in the distributed ledger network that are to be used as inputs to the transaction. The output parameter includes second addresses whose respective second states are modified by the transaction. The DLT node evaluates the transactions based on the dependencies, where the evaluation of the transactions includes evaluating a first and a second transaction in parallel when the first transaction and the second transaction are independent from one another, and evaluating the first transaction and the second transaction sequentially, when the first transaction and the second transaction are not independent from one another.

The embodiments herein have several benefits and advantages when compared to previous approaches of transaction evaluation in distributed ledger networks. DLT nodes (e.g., Miners and/or Validators in block based DLTs) are able to a priori determine an efficient execution strategy for transactions, speeding up the evaluation process if multiple cores or processors are available at the DLT nodes. Further, constrained devices that may operate a light protocol to communicate with the DLT network are able to securely learn the dependencies of transactions on addresses they are watching without relying on dependency information provided by the light protocol server. Explicit dependencies can also be used to identify transactions that can be performed in independent shards of the DLT, facilitating increased global scalability of the DLT.

FIG. 1 illustrates a block diagram of an exemplary distributed ledger (DLT) network for enabling parallel evaluation of transactions, in accordance with some embodiments. In the following description some examples will be described for a particular type of DLT networks, namely the blockchain networks. However, the embodiments described herein generally apply to other types of DLT networks, which will not necessarily be named herein. In the following description, an address identifies an addressable entity of which state in the DLT can be modified. A state of an address can be modified through the evaluation and validation of a transaction. In a non-limiting example, an address can identify an account, a smart contract, or a sub-entity of any of an account or a smart contract.

The DLT network 100 includes a set of DLT nodes 102A-M and a set of one or more transaction generation node 101A-N. The various nodes communicate through a physical network (wired, wireless, or a combination of wired and wireless networking technology) that is not illustrated.

Each one of the transaction generation nodes 101A-N is operative to generate one or more transactions to be recorded in the DLT network 100. For example, the transaction generation node 101A may generate a first set of transactions 111A. The transactions 111A may include one or multiple transactions that the transaction generation node 101A would like evaluated and validated by one or more DLT nodes in order to be added to the DLT datastore (not illustrated). The DLT datastore is an immutable record of all transactions that have been validated based on a consensus mechanism. Several consensus mechanisms can be used without departing from the scope of the present embodiments. In the present disclosure, DLT datastore and transactions record will be used interchangeably.

In the embodiments described herein a transaction generated by the transaction generation node includes an input parameter and an output parameter. The input parameter includes indicators of states of addresses in the distributed ledger network that are to be used as inputs to the transaction. The output parameter includes addresses whose respective states are modified by the transaction.

When compared to previous DLT transaction generation, the transaction in the embodiments presented herein is augmented by the transaction generation node with precondition state and dependency data in the form of the input parameter and the output parameter. The input parameter and the output parameter allow to identify dependencies between transactions. As it will be discussed below, the input parameter and the output parameter allow a DLT node (such as a miner and/or a validator) to exploit dependency information to parallelize computations of transactions that do not depend on one another.

In the embodiments herein a standard transaction is augmented to include the input parameter and the output parameter in addition to other standard parameter that may be included in the transaction. For example, standard parameters may include an address that identifies the sender of the transaction, an address that identifies the destination (e.g., the account that is to receive a cryptocurrency from the sender), a value of the cryptocurrency that is to be transmitted from the sender to the destination, and one or more additional data/information that relate to the transaction. For example, the additional data/information can be used as an input to a smart contract when the DLT network is based on smart contracts. In some embodiments, the standard parameters contain parameters needed for the proper evaluation of the transaction (including source and destination addresses, sequence numbers, input parameters for smart contracts, validity bounds etc.). The content of the standard parameters varies from DLT to another and may contain other parameters that restrict the transaction's validity in other forms (such as block limit, etc.).

In addition to these standard parameters, the transactions include indicators of states of addresses in the distributed ledger network that are to be used as inputs to the transaction (i.e., the input parameter). The indicators are a representation of transaction input addresses and their respective states at the time the transaction is generated. The transaction further includes addresses whose respective states are modified by the transaction (i.e., the output parameter).

In some embodiments, for example in smart contract based DLT networks, the input and output parameter can be included to the transaction data of the smart contract. Thus in this embodiment, the dependency information is received as part as the transaction data that is used by the smart contract when it is called to be executed by a DLT node.

In order to determine the input and output parameters for a transaction, the transaction generation node 101A computes the transaction locally using the current state of the DLT. In the following description a state of the DLT refers to the state of the immutable transactions record of the DLT. The state of the DLT at a given time is a mapping from addresses in the DLT to values, e.g. $\mathcal{G} = \{a_1 \rightarrow v_1, \ldots, a_k \rightarrow v_k\}$. The type of addresses and values is DLT specific. As described above an address may identify an account, a smart contract, or a sub-entity of an account or a smart contract. The value associated with an address contains information such as the balance of an account for DLTs with cryptocurrencies, a state of the smart contract and the contract code itself for smart contract based DLTs. Upon computation of the transaction, the transaction generation node 101A determines the set of addresses that the evaluation depends on. The transaction generation node 101A determines a set of addresses whose input is used when the transaction is evaluated and the set of modified states. Once the input addresses are determined, the transaction generation node 101A may determine the state of these input addresses based on the global state of the immutable transactions record of the DLT. The transaction generation node 101A determines for each state of an input address an indicator that is included in the input parameter of the transaction. The input parameter of the transaction may include one or more indicators, each indicator associated with a state of an input address when the transaction at the time the transaction is evaluated/executed by the transactions generation node 101A. In some embodiments, an indicator of a state of an address can include the current state of the address (i.e., the value of the state of the address as currently recorded in the DLT network prior to the evaluation of the transaction), the input address and a hash of the state of the input address, or the input address only without its current state or a hash of the current state. Thus, the indicator of the state of an address that is used as input to the transaction can have several values without departing from the scope of the present embodiments.

The transaction generation node 101A determines from the modified states that are determined from the evaluation of the transaction, zero or more addresses. These addresses are the ones whose state is modified by the transaction. The set of addresses are included in the output parameter. The transaction generation node 101A generates the augmented transaction that is to be sent to the DLT nodes with the input parameter and the output parameter. While the transaction generation node 101A evaluates the transaction, this evaluation is not validated and does not cause the state of the DLT to be modified. This evaluation is performed in the interest of obtaining the input and output parameters and modifying the transaction to include this information prior to being transmitted to other nodes of the DLT network for actual evaluation and validation.

In some embodiments, after the augmented transaction is sent, the transaction generation node 101A is operative to detect whether the transaction has been included in the ledger. The transaction generation node 101A is further operative to detect whether the transaction is no longer valid. The transaction generation node 101A is operative to detect whether the transaction is still valid or not as it can check for subsequent states of the DLT network whether the original input parameter set for a transaction is still valid. In other words, the transactions generation node 101A can determine whether the state of the addresses included in the input parameter corresponds to a current state of the DLT network prior to the transaction being evaluated.

If the state included in the input parameter of the transaction is different from the current state of the DLT network, then some of the input state to the transaction has changed and it can no longer be included in a future state of the DLT network. At this point the transaction generation node 101A may choose to re-send the transaction with new input state included in an updated input parameter and output address information.

Referring back to FIG. 1, the transaction generated by the transaction generation node 101A is distributed across the DLT network 100. In some embodiments, the propagation of the transaction can be done via peer-to-peer mechanism, but other mechanisms, such as direct communication with a DLT node, multicast to group of DLT nodes, etc., can also be used. Regardless of the transport mechanism of the transaction, one or more DLT nodes receive the transaction to be evaluated. The transactions transmitted from the transaction generation nodes 101A-N are received by one or multiple DLT nodes, such as DLT node 102A-M.

Each one of the DLT nodes 102A-M supports a DLT protocol that allows the nodes to receive transactions from the transaction generation nodes and evaluate the transactions. In some embodiments, the DLT node 102A is operative to store and update a global digital ledger of the DLT network by performing operations of digital ledger technology. For example, the DLT node 102A can evaluate and validate transactions to include them in the immutable transactions record. For example, the DLT nodes 102A-M can be nodes of a smart contract-based blockchain. In another example, the DLT nodes 102A-M can be nodes of a blockchain network that is operative to record transactions in blocks. In some embodiments, one or more of the DLT nodes 102A-M can be a constrained network device that has limited processing and storage capabilities such as an Internet of Things (IoT) device, and that is operative to perform operations of a light DLT protocol. The light DLT protocol enables the constrained network device to receive transactions of the DLT network 100.

In some embodiments, the DLT nodes 102A-M may be operative to perform some form of initial validation on the transactions by verifying that the transactions satisfy criteria of the DLT network protocol, and any invalid transactions are silently dropped on reception prior to the evaluation of the transactions. The initial validation of the transactions is optional and may be skipped in some embodiments.

In some embodiments, a DLT node 102A can be a node acting as a miner in the DLT network. A miner is operative to select pending transactions, which have not yet been included in the DLT datastore, e.g., transactions received from one or more of the transaction generation nodes 101A-N. A miner is generally any entity that in the DLT is allowed to update the state of the distributed ledger. In some distributed ledgers, namely blockchains, a miner evaluates transactions and includes the transactions in a block that is to be added to the immutable chain of blocks. When the DLT node 102A is a miner in a blockchain, the node may include a block generator 117 that receives the evaluated transactions and includes the valid transactions into a block. The block is then transmitted, as per the DLT protocol to multiple nodes according to the consensus protocol of the distributed ledger network. In some other exemplary DLTs, the DLT node 102A may be referred to as a "confirmer", an "orderer", etc. In some embodiments, the DLT node 102A can be a node acting as a validator. The validator receives as input the state changes as they were defined by the miners and verify that the state change rules of the DLT have been correctly followed (rejecting invalid state changes) by evaluating and validating the transactions that caused the state to change. The DLT node 102A, regardless of it being a miner or a validator, is operative to evaluate transactions based on the input and output parameters included as part of the transaction. In some embodiments, the DLT node 102A may be a constrained network device that has limited processing and storage capabilities and that is operative to receive and evaluate transactions of a DLT network.

The DLT node 102A has multiple transactions 112 that need to be evaluated. While the set of transactions 112 illustrated shows 7 transactions, this is intended to be exemplary. A DLT node 102A may need to evaluate any number of transactions (including tens, hundreds, thousands of transactions, etc.). These transactions can be received from multiple transaction generation nodes. In some embodiments, one or more of these transactions may be generated by the DLT node 102A itself. Each one of the transactions (A, B, C, D, E, F, and G) may include an input parameter and an output parameter. For example, the transaction A include the Input_P_a parameter and the Output_P_a parameter. The input and output parameter may be bounded and defined values such that each set is defined. Alternatively, the input and output parameter may be unbounded (undefined) for a given transaction (e.g., transaction C). In some embodiments, the DLT node may receive transactions that include the input and output parameter, in other embodiments, the DLT node 102A may receive transactions that do not include the input and output parameters. The DLT node 102A is operative to evaluate transactions that have both input and output parameter and other transactions for which these parameters are not defined.

In some embodiments, the DLT node 102A determine based on the input parameter of each transaction whether the transactions is consistent with a current state of the DLT network 100. The input parameter which is representative of states of addresses that are input to the transaction at the time the transaction is generated need to correspond to the state of the DLT when restricted to those addresses as known to the DLT node 102A. If the state of the addresses identified in the input parameter of a transaction does not correspond to the view that the DLT node 102 has from the DLT network of these addresses, the DLT node 102A drops the transaction. Alternatively, when the state of the addresses identified in the input parameter of the transaction correspond to the view that the DLT node 102A has of the DLT network, the transaction is kept to be evaluated with one or more other valid transactions.

In some embodiments, upon determining that a state of input addresses indicated in the input parameter of a transaction is not consistent with the current state of the DLT as seen by the DLT node 102A, instead of dropping the transaction, the DLT node 102A may optimistically keep the transaction to be evaluated at a later time. For example, the transaction may depend on another transaction that has not yet been evaluated by the DLT node 102A and which when evaluated will cause the state of the input addresses of the transaction to become consistent with an updated state of the DLT and allow the DLT node 102A to evaluate the transaction.

The DLT node 102A determines, based on the input and output parameters of a subset of the transactions, a set of dependencies 114 between the multiple transactions. Dependencies 114 illustrate exemplary dependencies that may exist between transactions. The dependencies 114 show that transaction F and D depend from transaction A, transaction D and G depend from transaction B, transaction E does not depend on any transaction, and transaction C does not depend on any transaction. Transaction C has an additional indication, which is that the transaction is unbounded, i.e., the input addresses and the output addresses are unknown prior to the evaluation of the transaction. The determination of the dependencies between the transactions can be performed by determining whether two transactions are dependent or independent for each pair of transactions that the DLT node is to evaluate.

In some embodiments, the DLT node 102A determines that a first transaction (e.g., transaction A) and a second transaction (e.g., transaction B) are independent from one another by determining that no address that is determined based on a first input parameter of the first transaction is included in a second output parameter of the second transaction and that no address that is determined based on a second input parameter of the second transaction is included in a first output parameter of the first transaction. When no address that is determined based on a first input parameter of the first transaction A is included in a second output parameter of the second transaction B, it is an indication that the addresses modified by the second transaction B are not used as input to the first transaction A. When no address that is determined based on a second input parameter of the second transaction B is included in a first output parameter of the first transaction A, it is an indication that the addresses modified by the first transaction A are not used as input to the second transaction B. Therefore, in order to determine that two transactions are independent, none of the addresses modified by a transaction can be used as input to the other transaction. When the two transactions are independent from one another, the DLT node 102A may evaluate the two transactions in parallel if there is sufficient computing resources at the DLT node.

Alternatively, the DLT node 102A may determines that a first transaction, e.g., transaction A, and a second transaction, e.g., transaction F, are not independent from one another. The determination that two transactions are not independent, i.e., that at least one of the transactions depends on the other one, can be performed by determining that at least one address that is determined based on a second input parameter of the second transaction F is included in a first output parameter of the first transaction A indicating that the second transaction F depends from the first transaction A. When at least one of the addresses that are modified by a transaction is used as input to another transaction, the two transaction are determined to be dependent on one another and the evaluation.

Upon determination of the dependencies 114, the DLT node 102A evaluates the transactions 112 based on these dependencies. In previous transaction evaluation mechanisms, without a knowledge of dependencies on a transaction, DLT nodes were restricted to sequential evaluation of these transactions, since for any transaction any subsequent transaction may depend on the state of addresses modified by the earlier transaction. The determination of the dependencies 114 allows the DLT node 102A to evaluate at least a subset of the transactions in parallel.

In some embodiments, the DLT node 102A may generate an evaluation plan 115 that provides an order of evaluation for the transactions. In the illustrated example, the evaluation plan shows that A, B, and E can be evaluated in parallel, that F, D, and G need to be evaluated following the evaluation of A, B, and E, and can be evaluated in parallel, and that C can be evaluated last as it is unbounded. In some embodiments, when the input parameter and/or the output parameter are unbounded, this is an indication that prior to the evaluation of the transaction, the state of the addresses that are to be used as input to the transaction is unknown or that the addresses that are to be modified by the transaction are also unknown. When the input parameter or the output parameter of a transaction, e.g., transaction C, are set to "unbounded" values, the transaction is evaluated sequentially with respect to other transactions. For example, in the example of FIG. 1, the transaction C is evaluated following the evaluation of all the other transactions. Even when the set of transactions 112 includes multiple transactions with defined input and output parameters and a set of transactions with unbounded input and output parameter, the DLT node 102A is able to optimize the evaluation of the set of transactions as it may place all unbounded transactions sequentially before or after all of the other transactions.

In the example of FIG. 1, if each transaction had a fixed length, given enough execution units, the evaluation of all of the transactions 112 (A, B, C, D, E, F, and G) would take three units of time, time t1, time t2, and time t3, while a strictly sequential plan (A→ . . . →G) would take seven units of time.

The transaction evaluator 116 then evaluates the multiple transactions based on an evaluation mechanism of the particular DLT network 100. In some embodiments, the evaluation include the execution of the transaction to obtain a new state of the DLT network for the input address of the transaction and the output address(es). The DLT node 102A is operative to evaluate a first and a second transactions in parallel when the first transaction and the second transaction are independent from one another (e.g., transaction A and B). The DLT node 102A is further operative to evaluate a transaction with another transaction in sequence when the transactions are not independent from one another (e.g., A and F).

The receipt of the input parameter and output parameter as part of a transaction allows the recipient of the transaction (e.g., a miner, or a validator node) to identify dependencies across all the transactions received and to plan an efficient parallel execution strategy for all of the transactions that is still guaranteed to result in the same global state as a sequential evaluation of the same transactions. This mechanism significantly increases performance of transaction evaluation and validation at a DLT node without reducing precision and accuracy of the state of the DLT.

The operations in the flow diagrams will be described with reference to the exemplary embodiments of FIG. 1. However, it should be understood that the operations of the flow diagrams can be performed by embodiments of the invention other than those discussed with reference to FIG. 1, and the embodiments of the invention discussed with reference to FIG. 1 can perform operations different than those discussed with reference to the flow diagrams.

Figure 2A:
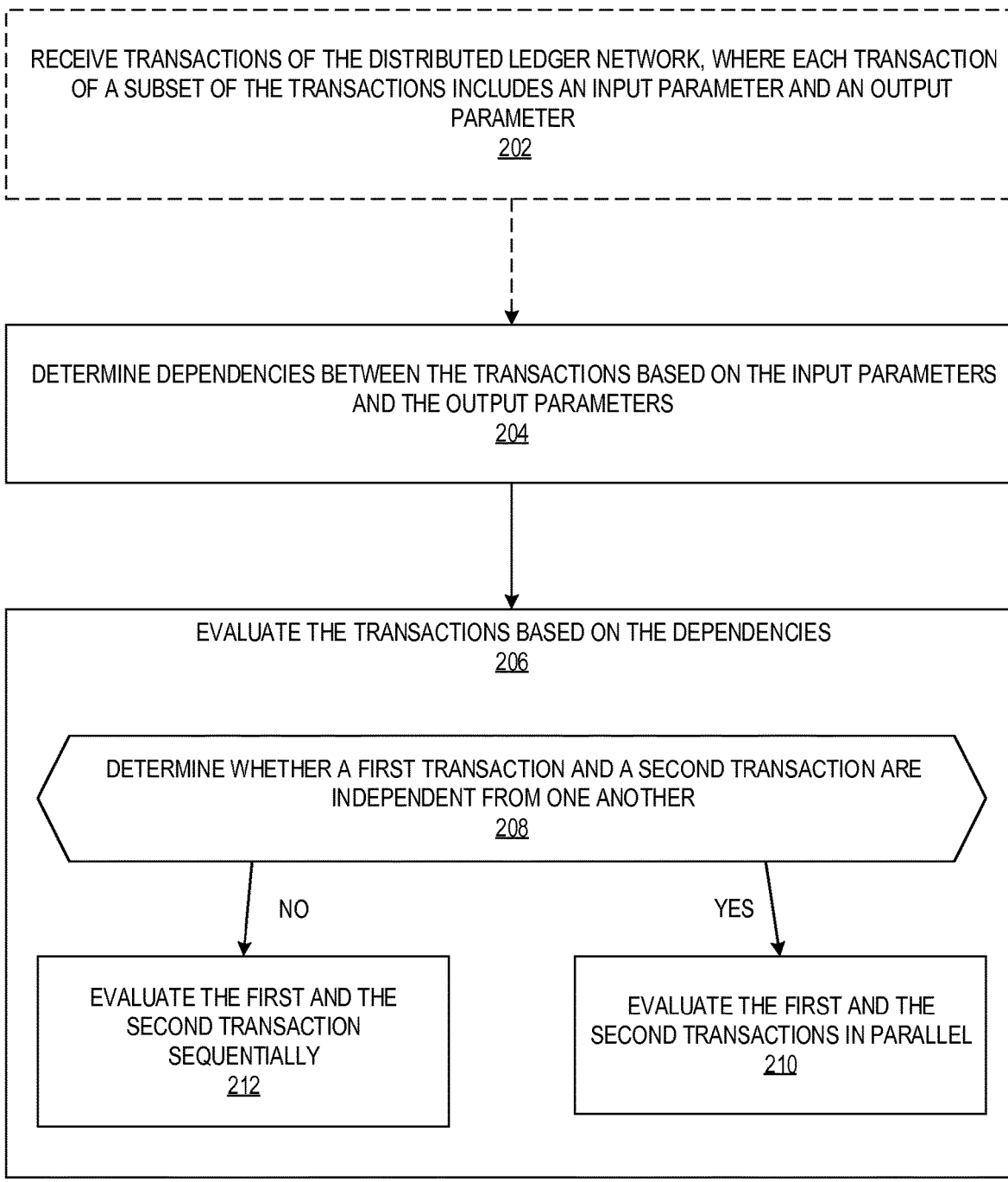
FIG. 2A illustrates a flow diagram of exemplary operations performed to enable efficient evaluation of transactions in a distributed ledger node, in accordance with some embodiments.

FIG. 2A illustrates a flow diagram of exemplary operations performed for efficient evaluation of transactions in a distributed ledger node, in accordance with some embodiments. The operations of FIG. 2A can be performed by a DLT node such as DLT node 102A. In some embodiments, the DLT node is operative to evaluate and validate multiple transactions to be added to the immutable transactions record (or the DLT datastore) of the DLT network 100. In some embodiments, the DLT node can be operative to evaluate the transactions and add them into another structure (e.g., a block) that is then forwarded to other DLT nodes in the network for performing the validation. In this first example, the DLT node may be referred to as a miner, an orderer, or a confirmer. In other embodiments, the DLT node may be operative to evaluate and validate the transactions causing the transactions to be included in the immutable transactions record by the DLT node. In this second example, the DLT node may be referred to as a validator. In some embodiments, the DLT node can be operative to act as either one of a miner or a validator, while in other embodiments DLT node can be operative to act as both a miner and a validator. While the operations below will be described with respect to the DLT node 102A, it is to be understood that multiple nodes in the network 100 are to perform similar operations to evaluate multiple transactions.

In some embodiments, the DLT node 102A receives, at operation 202, transactions of the distributed ledger network. In some embodiments, the transactions can be received from a transaction generation node, such as node 101A, or from multiple transaction generation nodes, such as nodes 101A-M. For example, when the DLT network is a blockchain network, the DLT node can be a miner receiving transactions from multiple transaction generation nodes or sender for inclusion of the transactions into a block. In some embodiments, the transactions can be received from another DLT node such as DLT node 102B. In some embodiments, when received from a DLT node 102B the transactions can be received as part of another data structure, such as a block. For example, when the DLT network is a blockchain network, the DLT node can be a validator that receives transactions as part of a block generated by a miner that is to be validated to be recorded in the immutable transactions record (e.g., the blockchain).

In some embodiments, each one of the transactions received by the DLT node 102A includes an input parameter and an output parameter. In other embodiments, a subset of the transactions that are received by the DLT node 102A includes an input parameter and an output parameter. In some embodiments, the operation 202 can be optional and the DLT node 102A may process transactions that are not received from other nodes but instead generated by the DLT node 102A itself. In other embodiments, the DLT node 102A is to process transactions that are both received from other nodes (e.g., node 101A, node 101B, and/or node 102B) and transactions that are generated by the DLT node 102A itself.

When a transaction includes an input parameter, the input parameter includes indicators of states of addresses in the distributed ledger network that are to be used as inputs to the transaction. When a transaction includes an output parameter, the output parameter includes addresses whose respective states are modified by the transaction. In some embodiments, the output parameter does not indicate any addresses. For example, when the transaction does not modify the state of any address in the DLT network, the output parameter may not include any address. Thus, the output parameter may include zero or more addresses whose respective states are modified by the transaction.

When compared to previous DLT networks, one or more transactions in the embodiments presented herein is augmented with pre-condition state and dependency data in the form of the input parameter and the output parameter. As it will be discussed below, the input parameter and the output parameter allow the DLT node 102A to exploit dependency information to parallelize computations of transactions that do not depend on one another.

In the embodiments herein a standard transaction is augmented to include the input parameter and the output parameter in addition to other standard parameter that may be included in the transaction. For example, standard parameters may include an address that identifies the sender of the transaction, an address that identifies the destination (e.g., the account that is to receive a cryptocurrency from the sender), a value of the cryptocurrency that is to be transmitted from the sender to the destination, and one or more additional data/information that relate to the transaction. For example, the additional data/information can be used as an input to a smart contract when the DLT network is based on smart contracts. In some embodiments, the standard parameters contain parameters needed for the proper evaluation of the transaction (including source and destination addresses, sequence numbers, input parameters for smart contracts, validity bounds etc.). The content of the standard parameters varies from DLT to another and may contain other parameters that restrict the transaction's validity in other forms (such as block limit, etc.).

In addition to these standard parameters, the transactions includes indicators of states of addresses in the distributed ledger network that are to be used as inputs to the transaction (i.e., the input parameter). The indicators are a representation of transaction input addresses and their state at the time that the transaction is generated. The transaction further includes addresses whose respective states are modified by the transaction (i.e., the output parameter).

In some embodiments, the input and output parameters for a transaction were determined by a transaction generation node such as node 101A. In some embodiments, when the DLT node 102A is the generator of the transaction, the DLT node 102A is operative to determine the input and output parameters. While the operations below will be described with reference to the transaction generation node, in other embodiments, the DLT node is also operative to perform these operation for generation of the input and output parameters for a transaction. The input and output parameter for a transaction as determined as a result of the transaction being evaluated/processed at the node (e.g., the transaction generation node or the DLT node) based on the current state of the DLT. In the following description a state of the DLT refers to the state of the immutable transactions record of the DLT at a given time t. The state of the DLT at a given time is a mapping from addresses in the DLT to values, e.g. $\mathfrak{S} = \{a_1 \rightarrow v_1, \ldots, a_k \rightarrow v_k\}$. The type of addresses and values is DLT specific. The transaction generation node 101A determines a set of addresses whose input is used when the transaction is evaluated and the set of modified states. Once the input addresses are determined, the transaction generation node 101A may determine the state of these input addresses based on the global state of the immutable transactions record of the DLT. The transaction generation node 101A determines for each state of an input address an indicator that is included in the input parameter of the transaction. The input parameter of the transaction may include one or more indicators, each indicator associated with a state of an input address when the transaction at the time the transaction is evaluated/executed by the transactions generation node 101A. In some embodiments, an indicator of a state of an address can include the current state of the address (i.e., the value of the state of the address as currently recorded in the DLT network prior to the evaluation of the transaction), the input address and a hash of the state of the input address, or the input address only without its current state or a hash of the current state. Thus, the indicator of the state of an address that is used as input to the transaction can have several values without departing from the scope of the present embodiments.

The transaction generation node 101A determines from the modified states that are determined from the evaluation of the transaction, zero or more addresses. These addresses are the ones whose state is modified by the transaction. The set of addresses are included in the output parameter. The transaction generation node 101A generates the augmented transaction that is to be sent to the DLT nodes with the input parameter and the output parameter. While the transaction generation node 101A evaluates the transaction, this evaluation is not validated and does not cause the state of the DLT to be modified. This evaluation is performed in the interest of obtaining the input and output parameters and modifying the transaction to include this information prior to being transmitted to other nodes of the DLT network for actual evaluation and validation.

Upon receipt of the transactions, the flow of operations moves to operation 204, at which the DLT node 102A determines dependencies between the transactions 112 of the distributed ledger network. Each transaction of a subset of the transactions includes an input parameter and an output parameter. The input parameter includes indicators of first states of first addresses in the distributed ledger network that are to be used as inputs to the transaction. The output parameter includes zero or more second addresses whose respective zero or more second states are modified by the transaction.

The flow of operations then moves to operation 206, at which the DLT node 102A evaluates the transactions based on the dependencies. The evaluation of the transactions causes transactions which are independent from one another to be processed in parallel and transactions where at least one depend on another one to be processed based on an order that satisfies the dependency. For example, in response to determining that a first transaction and a second transaction of the plurality of transactions are independent from one another, the DLT node 102A evaluates, at operation '210, the first and the second transactions in parallel. Alternatively, in response to determining that the first transaction and the second transaction are not independent from one another, the DLT node 102A evaluates, at operation '212, the first transaction and the second transaction sequentially. The order of sequential evaluation of the first and the second transaction depends on the way that the first and the second transaction depend from one another. For example, when the first transaction depends from the second transaction, the second transaction is evaluated prior to the first transaction. In another example, when the second transaction depends from the first transaction, the first transaction is evaluated prior to the second transaction.

Figure 2C:
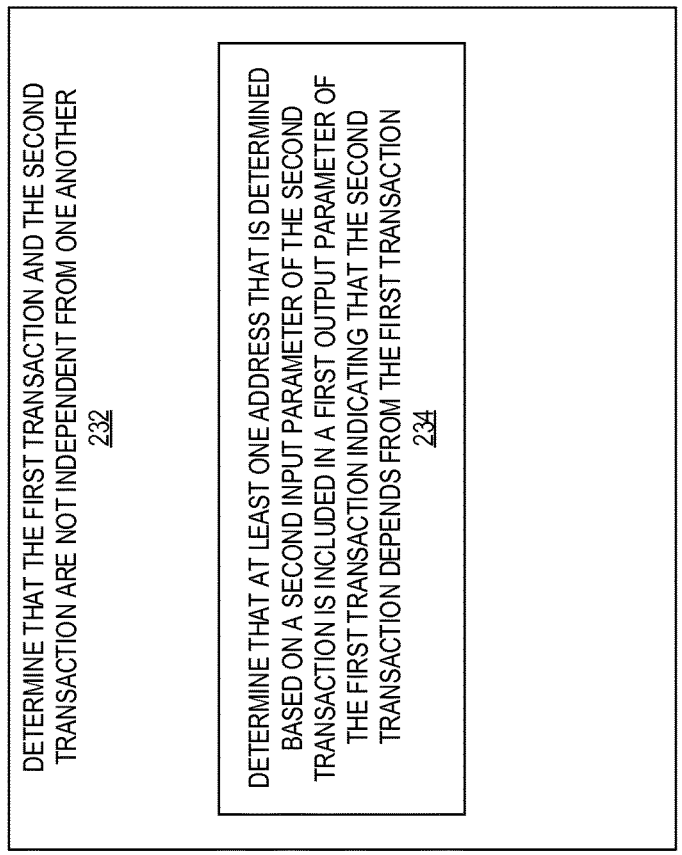
FIG. 2C illustrates a flow diagram of exemplary operations that can be performed for determining whether transactions are dependent from one another, in accordance with some embodiments.
Figure 2B:
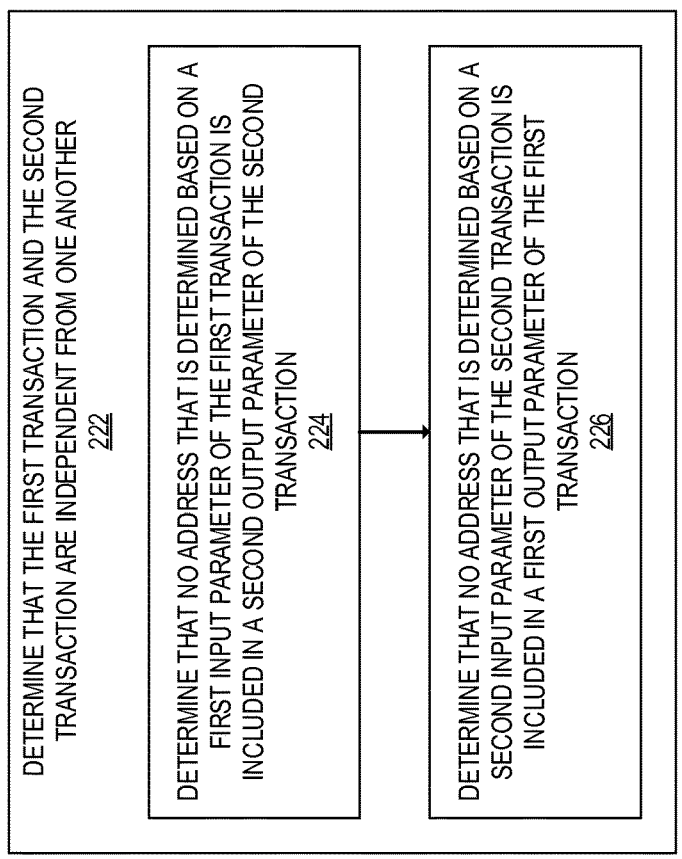
FIG. 2B illustrates a flow diagram of exemplary operations that can be performed for determining whether transactions are dependent from one another, in accordance with some embodiments.

FIG. 2B illustrates a flow diagram of exemplary operations that can be performed for determining whether transactions are dependent from one another, in accordance with some embodiments. In some embodiments, the DLT node 102A determines, at operation '222, that the first transaction and the second transaction are independent from one another by performing operations '224 and '226. The first transaction includes a first input parameter and a first output parameter. The first input parameter includes first indicators of first states of first addresses in the distributed ledger network, where the first addresses are to be used as inputs to the first transaction. The first output parameter includes addresses whose respective states are modified by the first transaction. The second transaction includes a second input parameter and a second output parameter. The second input parameter includes second indicators of states of addresses in the distributed ledger network, where the addresses are to be used as inputs to the second transaction. The second output parameter includes addresses whose respective states are modified by the second transaction. The determination that the first and the second transaction are independent includes that the determination that the first transaction does not depend on the second transaction (operation '224) and that the second transaction does not depend on the first transaction (operation '226).

At operation '224, the DLT node 102A determines that no address that is determined based on the first input parameter of the first transaction is included in the second output parameter of the second transaction. This determination indicates that a state of an address that is input to the first transaction during the evaluation of the first transaction is not modified by the second transaction when the second transaction is evaluated. At operation '226, the DLT node 102A determine that no address that is determined based on a second input parameter of the second transaction is included in a first output parameter of the first transaction. This determination indicates that a state of an address that is input to the second transaction during the evaluation of the second transaction is not modified by the first transaction when the first transaction is evaluated. The determination that the two transactions are independent is an indication that the two transactions can be evaluated in parallel.

Alternatively, when at least one of the transaction depends from the other one, the evaluation of the transactions is performed differently. FIG. 2C illustrates a flow diagram of exemplary operations that can be performed for determining whether transactions are dependent from one another, in accordance with some embodiments. The DLT node 102A determines, at operation '232, that the first transaction and the second transaction are not independent from one another by determining, at operation '234, that at least one address that is determined based on a second input parameter of the second transaction is included in a first output parameter of the first transaction indicating that the second transaction depends from the first transaction. This determination indicates that the second transaction depends from the first transaction and causes the second transaction to be evaluated following the evaluation of the first transaction.

In some embodiments, upon determining the dependencies 114 between the multiple transactions that are to be executed/evaluated, the DLT node 102A determines an evaluation plan 115. In other embodiments, the DLT node 102A may evaluate the transactions based on the dependencies without an explicit determination of an evaluation plan and the determination of the evaluation plan can be skipped. In this latest embodiment, the evaluation of the transactions can be performed by selected a transactions that has yet to be executed, determine whether all transactions from which it depends have been executed. Upon determining that all transactions from which it depends have been executed/ evaluated, evaluating the transactions. Upon determining that at least one transactions from which it depends has not yet been executed/evaluated, selecting another transaction to be evaluated and postponing the evaluation of the transaction until all of the transactions from which it depends have been evaluated.

Figure 2D:
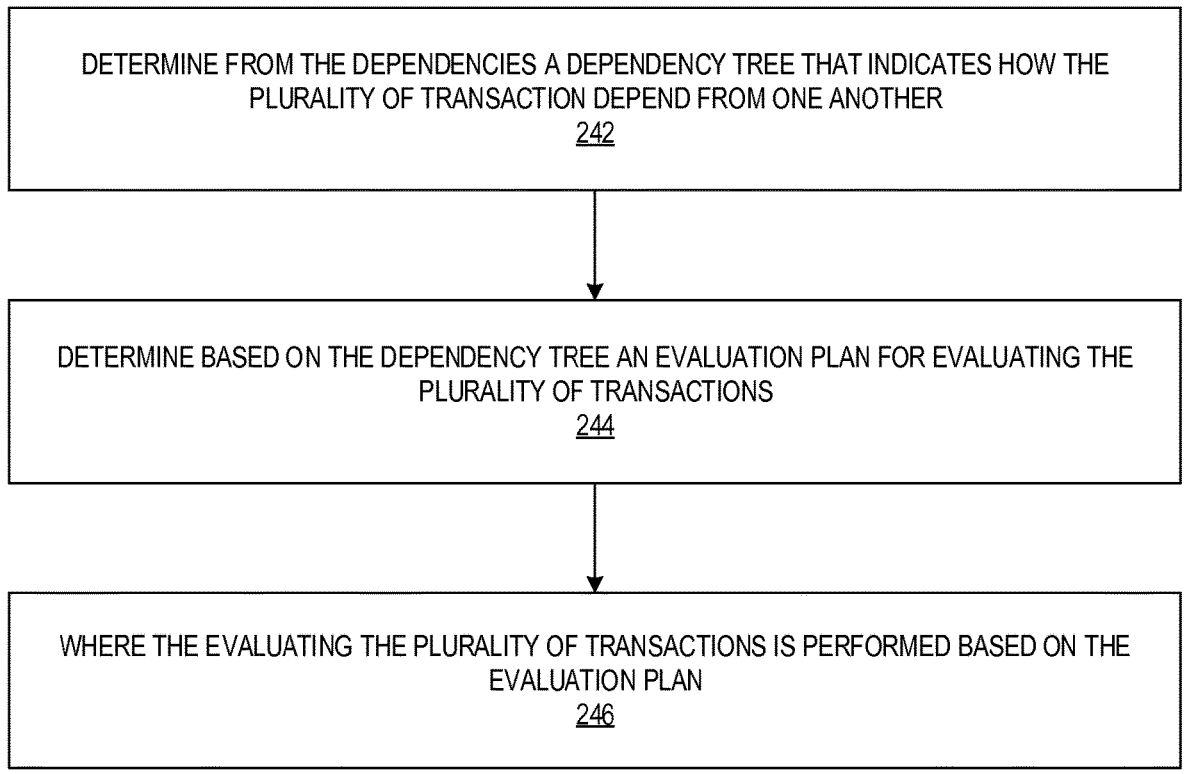
FIG. 2D illustrates a flow diagram of exemplary operations that can be performed for determining an evaluation plan for a set of transactions, in accordance with some embodiments.

FIG. 2D illustrates a flow diagram of exemplary operations that can be performed for determining an evaluation plan for a set of transactions, in accordance with some embodiments. At operation '242, the DLT node 102A determines from the dependencies a dependency tree that indicates how the plurality of transactions depend from one another. In FIG. 1, the dependencies 114 are represented based on a dependency tree. The dependency tree shows that when two transactions are linked by an edge of the tree, one of the transactions depends from the other one (A and F, A and D, B and D, or B and G). Alternatively, when two transactions are not linked by an edge of the tree, it is an indication that none of the transactions depends from the other.

The flow then moves to operation '244, at which the DLT node 102A determines based on the dependency tree an evaluation plan for evaluating the plurality of transactions. The evaluation plan identifies the order with which the transactions are to be evaluated while respecting the dependency tree or the dependencies. The evaluation plan is determined such that any transaction that depends from another one is set to be evaluated after completion of the evaluation of the transaction from which it depends (e.g., transactions A and F). The evaluation plan is determined such that transactions that are independent may be evaluation in parallel (e.g., transactions A, B, and E). Upon determination of the evaluation plan, the DLT node 102A evaluates the transactions is performed based on the evaluation plan.

Figure 2E:
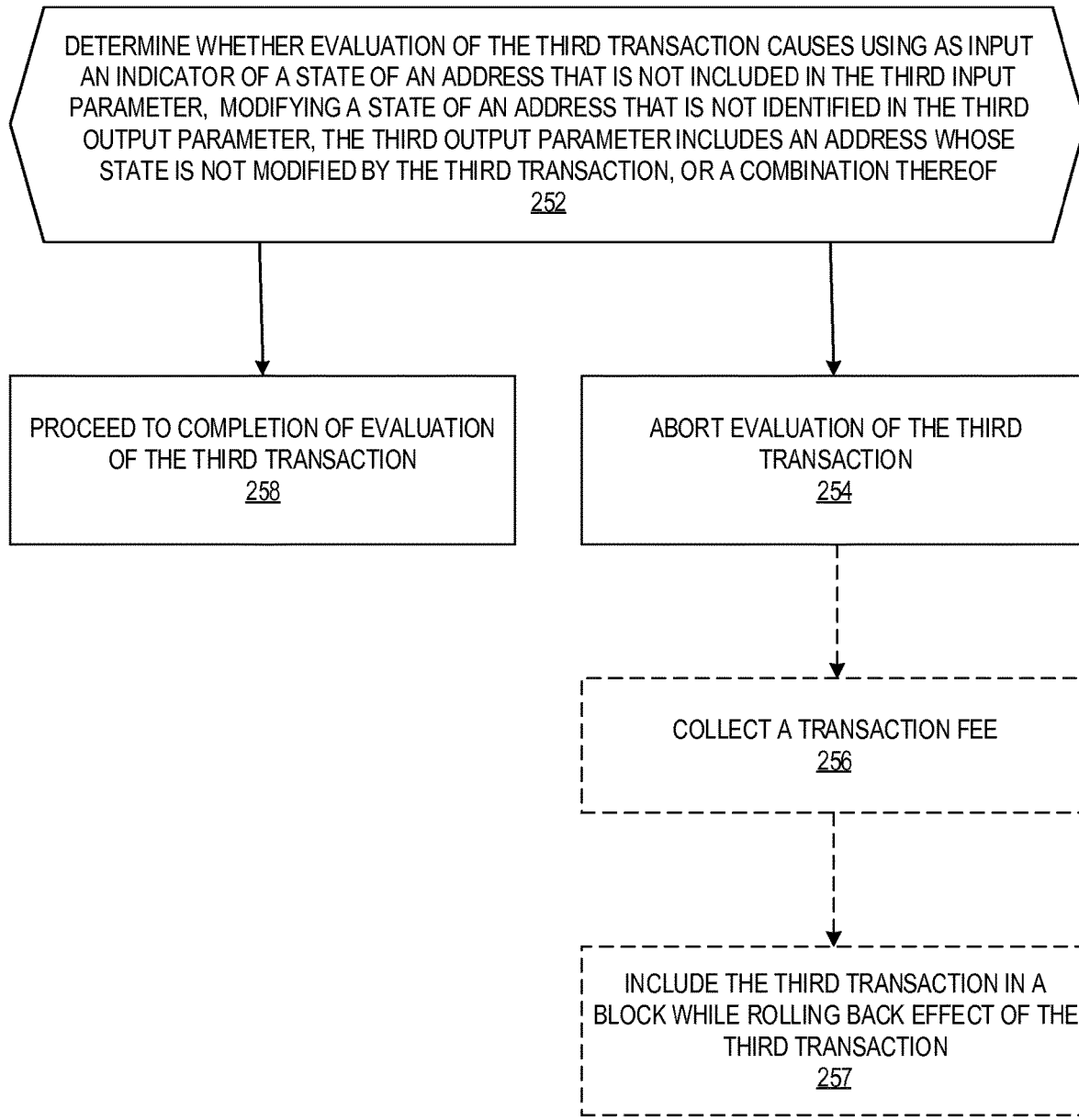
FIG. 2E illustrates a flow diagram of operations for verifying the transaction based on the input and output parameters, in accordance with some embodiments.

FIG. 2E illustrates a flow diagram of operations for verifying the transaction based on the input and output parameters, in accordance with some embodiments. In some embodiments, prior to the evaluation of a transaction, the DLT node 102A may determine whether the transaction is valid and consistent with the input and output parameters that are included in the transaction. In some embodiments, this verification may be performed prior to determining the dependencies between multiple transactions that are to be evaluated by the DLT node 102A. At operation 252, the DLT node 102A determines whether evaluation of a transaction causes 1) using as input an indicator of an address that is not included in the input parameter of the transaction, 2) modifying a state of an address that is not identified in the third output parameter, or 3) the output parameter of the transaction includes an address whose state is not modified by the third transaction, or a combination of 1), 2), or 3).

In response to determining that the evaluation of the transaction causes using as input an indicator of a state of an address that is not included in the input parameter of the transaction, modifying a state of an address that is not identified in the output parameter of the transaction, or the output parameter includes an address whose state is not modified by the transaction, the DLT node 102A aborts, at operation '254, evaluation of the transaction. In some embodiments, when the transaction is aborted, the DLT node 102A may optionally perform operation 256 and operation 257. At operation 256, the DLT node 102A may collect a transaction fee for the unsuccessful evaluation of the transaction. At operation 257, the DLT node 102A includes the transaction in the transactions record while rolling back the effect of the transaction on the addresses that it modifies.

Alternatively, the DLT node 102A may determine that the evaluation of the transaction does not causes using as input an indicator of a state of an address that is not included in the third input parameter, modifying a state of an address that is not identified in the third output parameter, and the third output parameter includes an address whose state is not modified by the transaction, and proceeds to completing the evaluation of the transaction, at operation 258. The completion of evaluation of the transaction may include collecting the transaction fee, including the transaction in the transactions record, and modifying the state of the DLT based the transaction details.

The embodiments herein describe a transaction that is augmented to include input and output parameters as part of the transaction, where the input and output parameters include information that can be used by a DLT node to determine the dependencies between multiple transactions and execute or evaluate the transactions based on these dependencies. In some embodiments, e.g., in smart contract based DLTs, instead of including the dependency information as part of the transaction, the smart contract can be implemented with the functionality that allows to publish the dependencies. In this embodiment, the DLT node that is to evaluate the transaction determines these dependencies from the code of the smart contract itself prior to executing the smart contract. The DLT node 102A may need to access the code of the smart contracts prior to evaluating the transactions, in order to determine the dependencies between the different transactions. While the determination of the dependencies is slightly different then what is performed in other embodiments described herein, where the dependency information is explicitly included in the transaction as part of its associated input and output parameters, the DLT node is still able to determine the dependencies from the smart contracts of the transactions and use this information to establish an evaluation plan of the transactions that enables parallelization of the processing.

The embodiments herein have several benefits and advantages when compared to previous approaches of transaction evaluation in distributed ledger networks. DLT nodes (e.g., Miners and/or Validators in block based DLTs) are able to a priori determine an efficient execution strategy for transactions, speeding up the evaluation process if multiple cores or processors are available at the DLT nodes. Further, constrained devices that may operate a light protocol to communicate with the DLT network are able to securely learn the dependencies of transactions on addresses they are watching without relying on dependency information provided by the light protocol server. Explicit dependencies can also be used to identify transactions that can be performed in independent shards of the DLT, facilitating increased global scalability of the DLT.

Architecture:

An electronic device stores and transmits (internally and/ or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/ or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the disclosure may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video, etc.). In the embodiments described above the components of the DLT network 100 can be implemented on one or more network devices coupled through a physical network. For example, each of the ND 102A and the intermediary network devices 106 can be implemented on one ND or distributed over multiple NDs. In some embodiments, the ND 104 is a network device of reduced capability with limited processing, storage, and networking resources.

Figure 3:
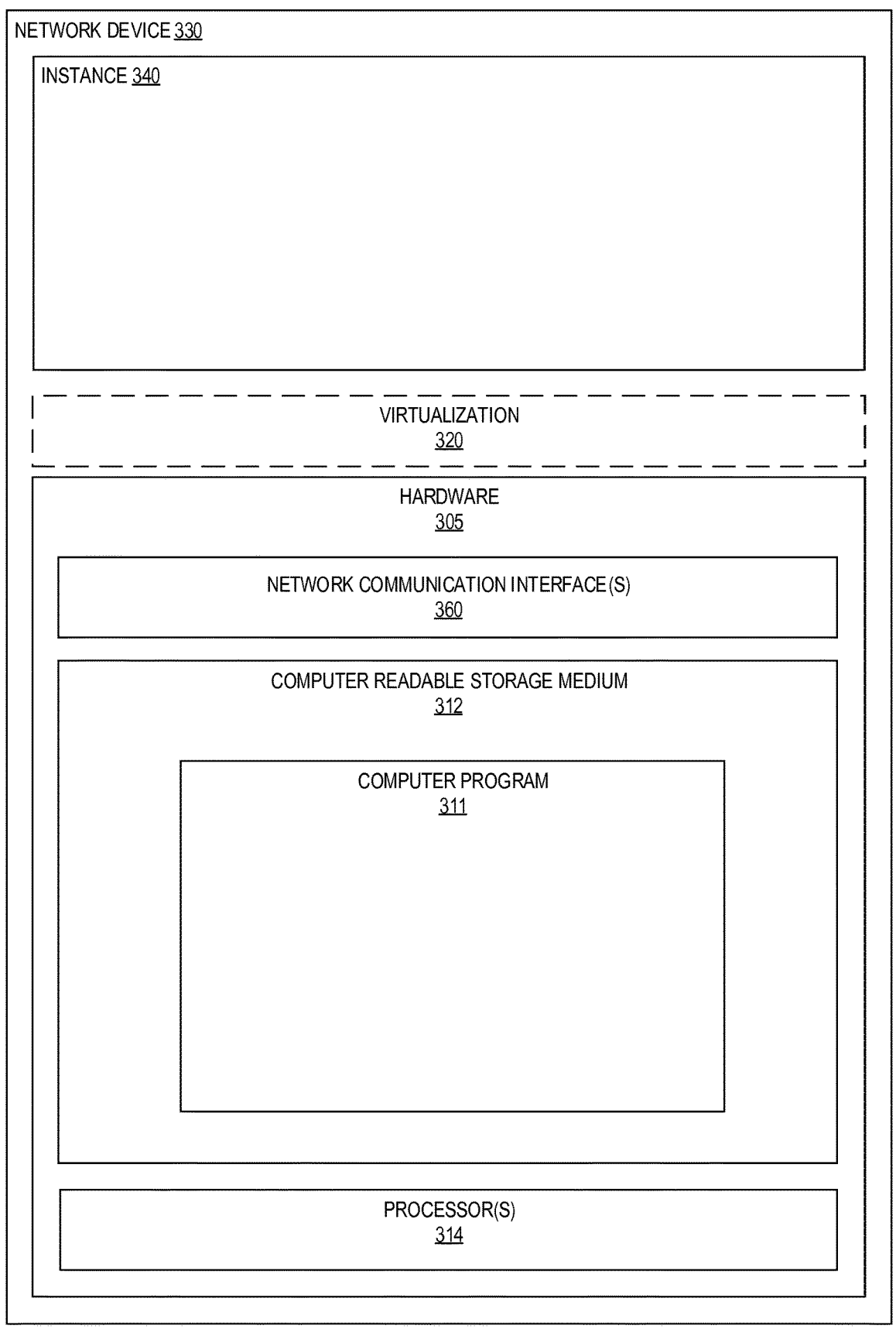
FIG. 3 illustrates a block diagram for a network device that can be used for implementing one or more of the DLT nodes described herein, in accordance with some embodiments.

FIG. 3 illustrates a block diagram for a network device that can be used for implementing one or more of the DLT nodes described herein, in accordance with some embodiments. According to one embodiment, the network device is an electronic device which includes hardware 305. Hardware 305 includes one or more processors 314, network communication interfaces 360 coupled with a computer readable storage medium 312. The computer readable storage medium 312 may include a computer program 311.

While one embodiment does not implement virtualization, alternative embodiments may use different forms of virtualization—represented by a virtualization layer 320. In these embodiments, the instance 340 and the hardware that executes it form a virtual server which is a software instance of the modules stored on the computer readable storage medium 312.

The computer program 311 includes instructions which when executed by the hardware 305 causes the instance 340 to perform the operations described with reference to FIGS. 1-2E. In this embodiment, the DLT node 102A is implemented on a single network device.

Figure 4:
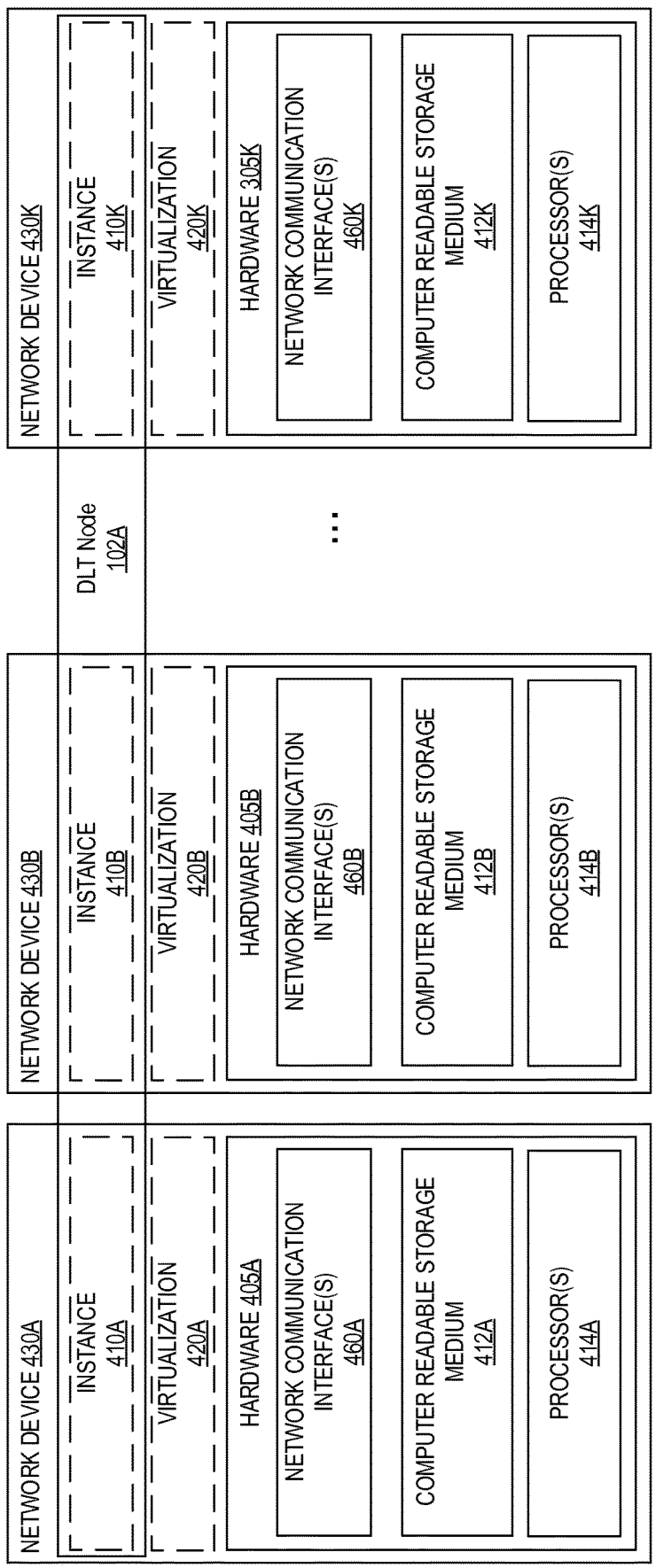
FIG. 4 illustrates a block diagram for network devices that can be used for implementing a DLT node described herein, in accordance with some embodiments.

FIG. 4 illustrates an exemplary embodiment in which a node is implemented on a multiple network devices. In the illustrated example, the DLT node 102A is distributed over multiple network devices '430A-430K, where each network device has a similar architecture as network device '330.

Similarly to the multiple implementations of a DLT node, a transaction generation node 101A-M may be implemented on one or multiple network devices.

Figure 5:
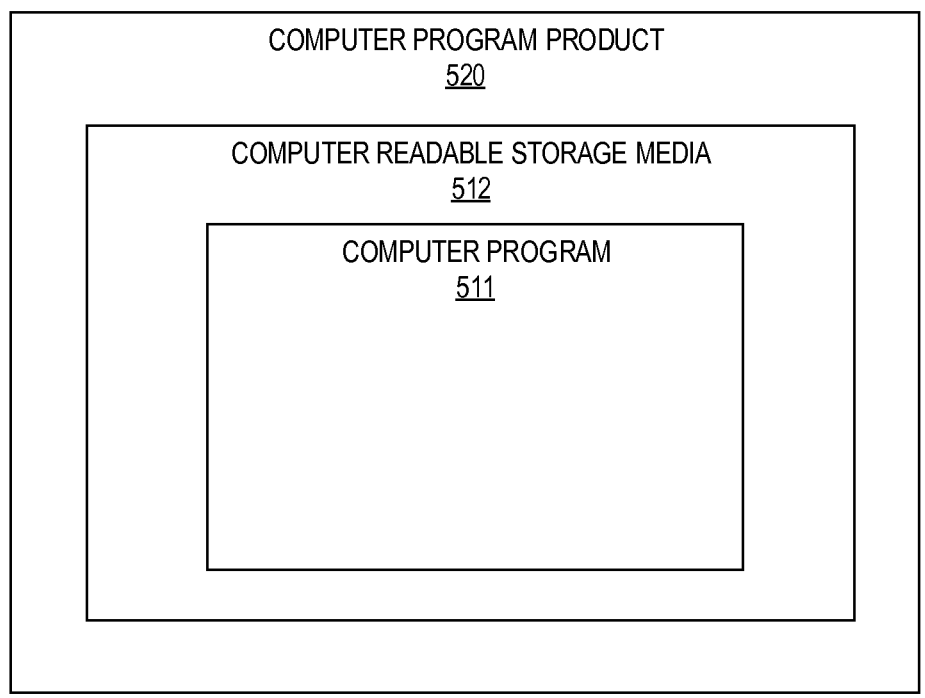
FIG. 5 illustrates a block diagram of an exemplary computer program product that can be used in some embodiments

FIG. 5 illustrates a block diagram of an exemplary computer program product that can be used in some embodiments. The computer program product 520 includes non-transitory computer readable media '512 having stored thereon a computer program '511. The computer program '511 comprises instructions which, when executed on at least one processor, cause the at least one processor to carry out a method as described with reference of FIGS. 1-2E. In some embodiments, the computer program '511 can be contained in a carrier, where the carrier includes one of an electronic signal, optical signal, radio signal or computer readable storage medium.

While the flow diagrams in the figures show a particular order of operations performed by certain embodiments of the disclosure, it should be understood that such order is exemplary (e.g., alternative embodiments may perform the operations in a different order, combine certain operations, overlap certain operations, etc.).

While the disclosure has been described in terms of several embodiments, those skilled in the art will recognize that the disclosure is not limited to the embodiments described, can be practiced with modification and alteration within the spirit and scope of the appended claims. The description is thus to be regarded as illustrative instead of limiting.

What is claimed is:

1. A method of transactions evaluation in a distributed ledger network, the method comprising:
determining dependencies between a plurality of transactions of the distributed ledger network, wherein each transaction of a subset of the plurality of transactions includes an input parameter including indicators of first states of first addresses in the distributed ledger network that are to be used as inputs to the transaction and an output parameter including zero or more second addresses whose respective zero or more second states are modified by the transaction; and evaluating the plurality of transactions based on the dependencies, wherein the evaluating includes:
  responsive to determining that a first transaction of the plurality of transaction and a second transaction of the plurality of transactions are independent from one another, evaluating the first and the second transactions in parallel, and
  responsive to determining that the first transaction and the second transaction are not independent from one another, evaluating the first transaction and the second transaction sequentially.

2. The method of claim 1, wherein the determining that the first transaction and the second transaction are independent from one another includes:
  determining that no address that is determined based on a first input parameter of the first transaction is included in a second output parameter of the second transaction; and
  determining that no address that is determined based on a second input parameter of the second transaction is included in a first output parameter of the first transaction.

3. The method of claim 1, wherein the determining that the first transaction and the second transaction are not independent from one another includes:
  determining that at least one address that is determined based on a second input parameter of the second transaction is included in a first output parameter of the first transaction indicating that the second transaction depends from the first transaction.

4. The method of claim 1 further comprising:
  determining from the dependencies a dependency tree that indicates how the plurality of transactions depend from one another; and
  determining based on the dependency tree an evaluation plan for evaluating the plurality of transactions; and
  wherein the evaluating the plurality of transactions is performed based on the evaluation plan.

5. The method of claim 1 further comprising determining that the input parameter of the transaction is consistent with a current state of the distributed ledger network.

6. The method of claim 1, wherein the plurality of transactions includes a third transaction including a third input parameter and a third output parameter, and the evaluating the plurality of transactions further includes:
  determining whether evaluation of the third transaction causes using as input an indicator of a state of an address that is not included in the third input parameter, modifying a state of an address that is not identified in the third output parameter, the third output parameter includes an address whose state is not modified by the third transaction, or a combination thereof; and
  responsive to determining that the evaluation of the third transaction causes using as input the indicator of the address that is not included in the third input parameter, modifying the state of the address that is not identified in the third output parameter, the third output parameter includes the address whose state is not modified by the third transaction, or a combination thereof.

7. The method of claim 1, wherein the evaluating the plurality of transactions is performed as part of validation of the plurality of transactions for adding the transactions into an immutable transactions record of the distributed ledger network.

8. A non-transitory computer-readable storage medium having stored thereon instructions that, when executed by one or more processors, cause a node in a distributed ledger network for transaction evaluation to perform operations comprising:
  determining dependencies between a plurality of transactions of the distributed ledger network, wherein each transaction of a subset of the plurality of transactions includes an input parameter including indicators of first states of first addresses in the distributed ledger network that are to be used as inputs to the transaction and an output parameter including zero or more second addresses whose respective zero or more second states are modified by the transaction; and
  evaluating the plurality of transactions based on the dependencies, wherein the evaluating includes:
    responsive to determining that a first transaction of the plurality of transaction and a second transaction of the plurality of transactions are independent from one another, evaluating the first and the second transactions in parallel, and
    responsive to determining that the first transaction and the second transaction are not independent from one another, evaluating the first transaction and the second transaction sequentially.

9. A node in a distributed ledger network for transaction evaluation, the node comprising:
  one or more processors; and
  a computer readable storage medium storing a set of computer readable instructions that, when executed by the one or more processors cause the node to:
    determine dependencies between a plurality of transactions of the distributed ledger network, wherein each transaction of a subset of the plurality of transactions includes an input parameter including indicators of first states of first addresses in the distributed ledger network that are to be used as inputs to the transaction and an output parameter including zero or more second addresses whose respective zero or more second states are modified by the transaction; and
    evaluate the plurality of transactions based on the dependencies, wherein to evaluate includes:
      responsive to determining that a first transaction of the plurality of transaction and a second transaction of the plurality of transactions are independent from one another, evaluate the first and the second transactions in parallel, and
      responsive to determining that the first transaction and the second transaction are not independent from one another, evaluate the first transaction and the second transaction sequentially.

10. The node of claim 9, wherein to determine that the first transaction and the second transaction are independent from one another includes to:
  determine that no address that is determined based on a first input parameter of the first transaction is included in a second output parameter of the second transaction; and
  determine that no address that is determined based on a second input parameter of the second transaction is included in a first output parameter of the first transaction.

11. The node of claim 9, wherein to determine that the first transaction and the second transaction are not independent from one another includes to:
  determine that at least one address that is determined based on a second input parameter of the second transaction is included in a first output parameter of the first transaction indicating that the second transaction depends from the first transaction.

12. The node of claim 9, wherein the set of computer readable instructions further to cause the node to:
   determine from the dependencies a dependency tree that indicates how the plurality of transactions depend from one another; and
   determine based on the dependency tree an evaluation plan for evaluating the plurality of transactions; and
   wherein to evaluate the plurality of transactions is performed based on the evaluation plan.

13. The node of claim 9, wherein the set of computer readable instructions further to cause the node to:
   determine that the input parameter of the transaction is consistent with a current state of the distributed ledger network.

14. The node of claim 9, wherein the plurality of transactions includes a third transaction including a third input parameter and a third output parameter, and to evaluate the plurality of transactions further includes to:
   determine whether evaluation of the third transaction causes using as input an indicator of a state of an address that is not included in the third input parameter, modifying a state of an address that is not identified in the third output parameter, the third output parameter includes an address whose state is not modified by the third transaction, or a combination thereof; and
   responsive to determining that the evaluation of the third transaction causes using as input the indicator of the address that is not included in the third input parameter, modify the state of the address that is not identified in the third output parameter, the third output parameter includes the address whose state is not modified by the third transaction, or a combination thereof.

15. The node of claim 11, wherein the evaluating the plurality of transactions is performed as part of validation of the plurality of transactions for adding the transactions into an immutable transactions record of the distributed ledger network.

* * * * *